Sept. 26, 1933.   J. J. FLANIGAN   1,928,350
DUPLICATING MACHINE
Filed Aug. 29, 1930   3 Sheets-Sheet 1

Witness:
William P. Kilroy

Inventor:
John J. Flanigan
By Wm. O. Belt   Atty.

Sept. 26, 1933. J. J. FLANIGAN 1,928,350
DUPLICATING MACHINE
Filed Aug. 29, 1930 3 Sheets-Sheet 2
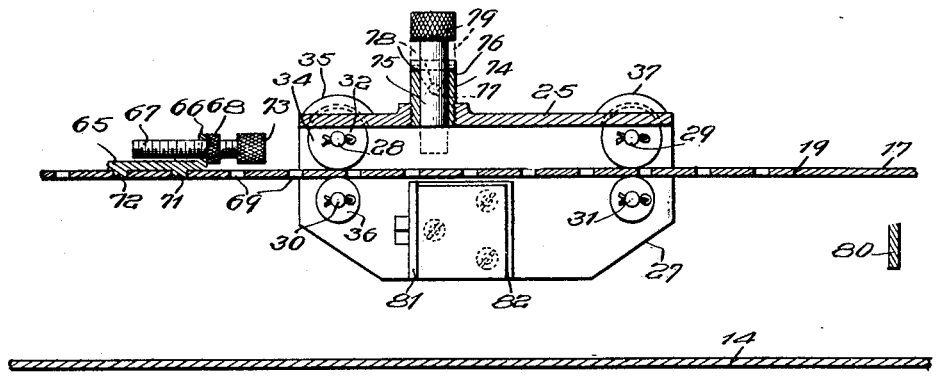
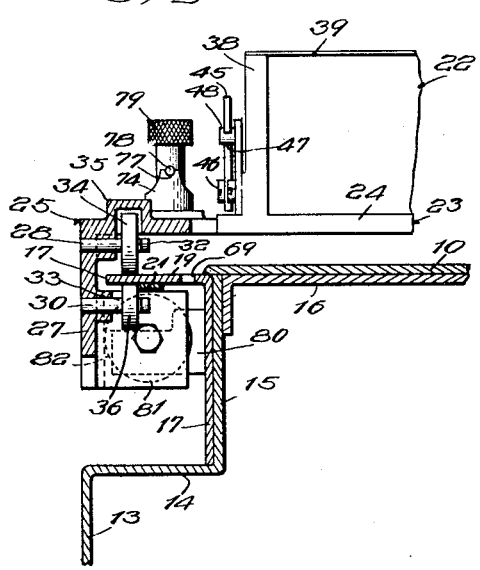
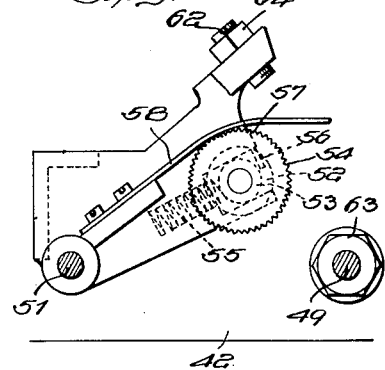
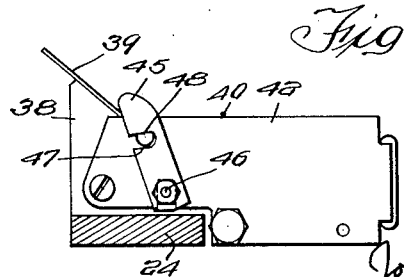
Witness:
William P. Kilroy
Inventor:
John J. Flanigan
Wm. O. Belt Atty.

Sept. 26, 1933.  J. J. FLANIGAN  1,928,350
DUPLICATING MACHINE
Filed Aug. 29, 1930   3 Sheets-Sheet 3
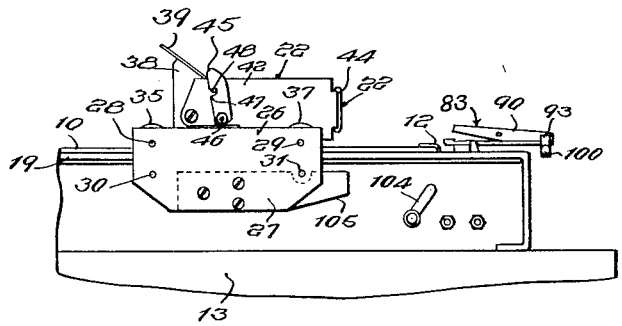
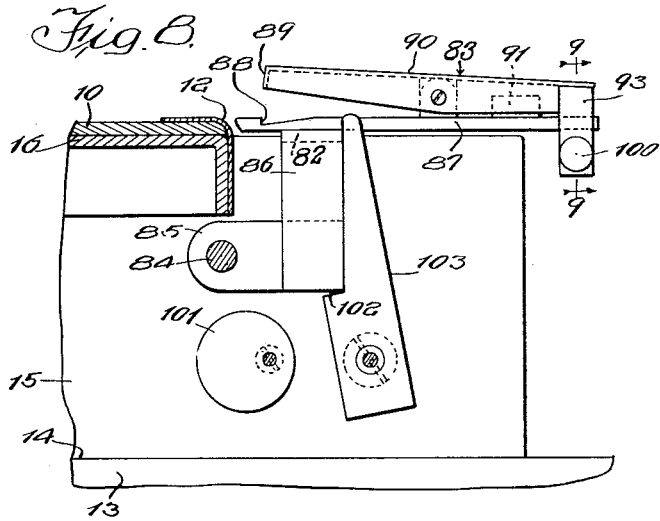
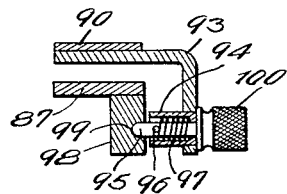

Patented Sept. 26, 1933

1,928,350

UNITED STATES PATENT OFFICE 1,928,350

DUPLICATING MACHINE

John J. Flanigan, Oak Park, Ill., assignor to Vivid, Incorporated, Chicago, Ill., a corporation of Illinois Application August 29, 1930. Serial No. 478,575

16 Claims. (Cl. 101—133)

This invention relates to duplicating machines, and more particularly to duplicating machines operating on the hectograph principle.

In machines of this character, a gelatin band is directed over a supporting bed, and a carriage is provided which is movable over the portion of the band extended across the bed, and among the objects of my invention are to provide a novel carriage which may be built as a unit in order that it may be readily installed in the machines and to permit interchanging of the carriages of similar machines. An ancillary object of the invention is to provide a carriage which may be constructed as a unit in order that a minimum number of parts will be embodied therein, and to so arrange the structure that a minimum number of locating points will be required in order that high accuracy may be attained, this resulting from the positioning of all parts from the locating points.

Another object is to provide a machine of the above described character wherein a novel carriage supporting arrangement is provided which will be sufficiently rigid to so support the carriage that uniform impressions will be taken from the gelatin band, and which will be so arranged that movement of the carriage laterally of the machine will be prevented.

A further object is to provide a duplicating machine embodying an adjustable stop that may be readily disposed in a number of different positions and which stop will embody a micrometer adjustment in order that very accurate positioning thereof may be attained.

A still further object is to provide a margin bar for a machine of the above described character which will be so constructed that margins of different sizes may be readily determined thereby, and to so arrange the device that the setting for determining the different margins may be readily attained.

Other objects of the invention are to provide a hectograph machine embodying the above set forth arrangements which will be simple and economical in construction and efficient in operation.

In the selected embodiment of the invention, illustrated in the accompanying drawings Fig. 1 is a top plan view of a machine constructed in accordance with my invention;

Fig. 3 is a longitudinal sectional view taken substantially on the line 3—3 on Fig. 1, and drawn to an enlarged scale;

Fig. 4 is a sectional view taken substantially on the line 4—4 on Fig. 1;

Fig. 5 is a fragmentary sectional view taken substantially on the line 5—5 on Fig. 1;

Fig. 6 is a fragmentary view taken substantially on the line 6—6 on Fig. 1;

Fig. 7 is a fragmentary view illustrating the forward end of the machine and showing the margin bar;

Fig. 8 is a longitudinal sectional view taken substantially on the line 8—8 on Fig. 1, and drawn to an enlarged scale; and Fig. 9 is a sectional detail view taken substantially on the line 9—9 on Fig. 8.

Figure 1:
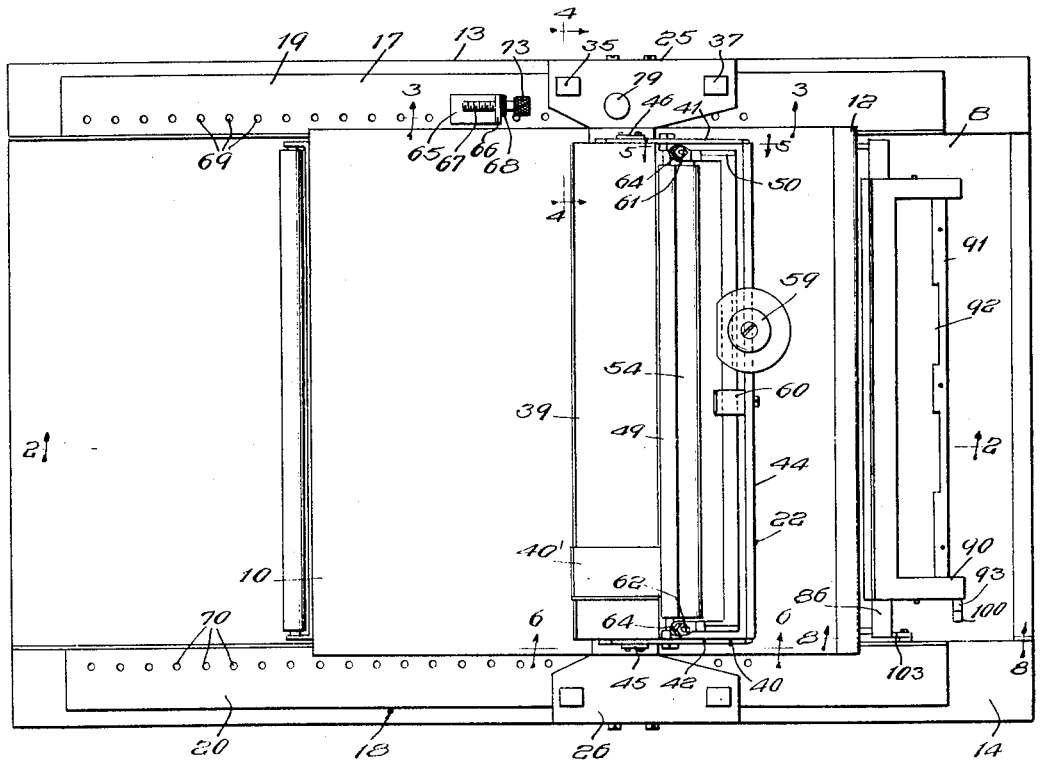

The invention is shown as being associated with a duplicating machine operating on the hectograph principle of the character described in my co-pending application, Serial No. 344,203, filed March 5, 1929, but it is to be understood that the invention is not to be limited to such usage as it may be used with any machine operating on this principle.

Duplicating machines operating on the hectograph principle employ a gelatin band for transferring an impression from an original writing to successive sheets subsequently impressed thereon. The gelatin band is extended across a horizontal bed plate 10 arranged at the top of the machine and is wound upon spools at opposite ends of the bed. These spools (not shown) are disposed below the bed plate and are supported in the machine in a suitable manner, and are so constructed that the band may be wound from one to the other in the usual manner. At the rear end of the bed plate 10, there is a guide roller 11 over which the gelatin band is directed to one of the spools, and at the forward end of the bed 10, there is a rounded guide strip 12 over which the band may be directed to the other of the spools. The machine embodies a main frame 13, the side walls of which include, at the upper ends thereof, L-shaped sections embodying horizontal portions 14 and vertical portions 15, and the portions 15 are spaced inwardly from the sides of the machine. A supporting plate 16 is secured to the portions 15 and extends therebetween and carries the bed 10 at the upper ends of the portions 15. Secured to the outer sides of the portions 15 and extended in opposite directions on opposite sides of the machine, are channel irons 17 and 18, which embody horizontally extending portions 19 and 20 disposed slightly below the upper surface of the supporting bed 10, as best illustrated in Fig. 4. On the under surface of the horizontal portions 19 and 20, strips, such as 21 (Fig. 4), are secured, which are spaced inwardly from the outer edges of the horizontal portions. The channel irons 17 and 18 are formed from sheet metal of sufficient gauge to provide a rigid support for the carriage which is movable along the supporting tracks provided by the channel irons 17 and 18. The carriage is generally indicated by 22, and embodies a main frame 23, which, if desired, may be a casting. The casting 23 includes a rail 24 (Fig.

2) which extends across the bed plate 10, and at opposite ends of the rail, are housings 25 and 26, which are preferably substantially L-shaped in that they include wall portions or aprons, such as 27, which depend below the rail 24, and which housings are of greater width than said rail. In the wall portion 27 of the housing 25, adjacent the forward and rear ends thereof and in horizontal alignment, are openings 28 and 29 (Fig. 7). Disposed below and in vertical alignment with the openings 28 and 29, are openings 30 and 31. Knurled pins, or other suitable securing devices are driven into the holes 28, 29, 30 and 31, in the manner illustrated in Fig. 4 wherein it may be seen that a pin 32 is driven into the opening 28 and that a pin 33 is driven into the opening 30. Mounted on the pin 32 is a wheel 34, a pocket 35 being provided in the upper wall of the housing 25 to provide clearance about said wheel. Similarly mounted on the pin 33 is a wheel 36, and by reason of the fact that the openings 28 and 30 are in vertical alignment, it is manifest that the wheels 34 and 36 will be arranged in vertical alignment. The adjacent portions of the peripheries of these wheels are spaced apart and receive therebetween the horizontal portion 19. In a similar manner, wheels are supported from pins driven into the openings 29 and 31, a pocket 37 being provided in the housing 25 to provide clearance for the wheel mounted on the pin disposed in the opening 29. It is, therefore, apparent that wheels are provided adjacent opposite ends of the housing 25, and thus this housing and therefore this end of the carriage is firmly supported for movement along the horizontal portion 19, which provides a trackway. In a similar manner, wheels are provided in the housing 26, and the wheels in this housing receive therebetween and travel along the horizontal portion 20, and thus this housing, and therefore this end of the carriage 22, is supported for movement along the horizontal portion 20, which provides a trackway. The wheels arranged in vertical alignment cooperate and constitute a pair. Either or both of the wheels may be made of a suitable substance, other than metal, to reduce noise during movement of the carriage and a substance of this character that may be used is a phenolic condensate. The wheels mounted on the pins, disposed in the openings 30 and 31, and the corresponding wheels in the housing 26, bear against the edge of the strip 21 in juxtaposition thereto, said wheels bearing against the outer edges of said strips, and this prevents endwise movement of the carriage. Therefore, while the carriage is supported for free movement longitudinally of the bed 10, it is manifest that movement transversely of the bed is prevented. The carriage is held on the trackways against vertical and transverse movement, the vertical movement being prevented by the disposition of wheels on both sides of the trackway, while the interengagement of the wheels and the strips prevents transverse or endwise movement.

Figure 2:
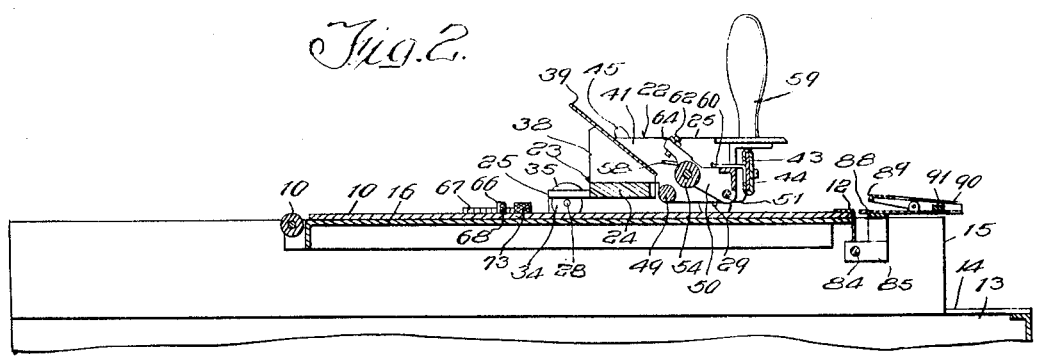
Fig. 2 is a longitudinal sectional view taken substantially on the line 2—2 on Fig. 1.

On the rail 24 adjacent the connection thereof with the housings 25 and 26 are lugs, such as 38 (Fig. 2), the upwardly disposed edges of which are tapered, and mounted on these edges is a paper guide plate 39, having a paper aligner 40' adjustably mounted thereon. The outer faces of the lugs 38 and the adjacent portions of the casting 23 are machined to provide locating points which serve to properly position the casting in a drill jig so that the various holes drilled in the casting may be accurately located. The lugs 38 serve as supports for the carriage frame 40 which may be pivoted from the position depicted in the drawings into a position whereat it will hold a sheet in engagement with the gelatin band. The frame 40 includes side plates 41 and 42, pivotally mounted on the outer faces of the lugs 38, and a unitary connecting rail 43 extended between the free ends of the side plates and on which a name plate 44 or the like is mounted. The carriage 40 is retained in operating position by locking dogs 45 mounted on a rod 46 journaled in the casting 23 and engaged by a spring (not shown) which urges the notches 47 in the locking dogs into engagement with pins 48 on the side plates 41 and 42. A clamping roller 49 has opposite reduced ends thereof journaled in the side plates 41 and 42. A platen roller 54 is movable from the position shown in Fig. 2 into engagement with and past the clamping roller 49 and when in the last position the platen roller lays the sheet to receive the impression on the gelatin band directed over the bed 10. A yieldable mounting is provided in the platen frame 50 for the platen roller 54 and this includes providing bifurcations 52 in the ends of the legs of the frame 50, in which bifurcations the bearing portions 53 of the roller 54 are disposed, and these bearing portions are acted on by springs 55, the action of which is limited by the studs 56. A handle 59 is provided on the platen frame 50, and a leaf spring 60 serves to retain the frame in the illustrated position. When the platen roller is disposed in the illustrated position, a sheet may be passed over the guide plate 39 and between the rollers 49 and 54 into engagement with a margin bar, to be described, after which the platen frame may be moved, and the sheet will be clamped between the platen roller and the clamping roller as soon as the platen roller has been moved sufficiently. However, by reason of the yieldable mounting of the platen roller, same may be moved past the center of the clamping roller to force the sheet into engagement with the gelatin band directed over the bed plate 10. The handle 59 is employed to bring about movement of the carriage 22, and thus the clamping of the paper is automatically brought about when the handle is grasped and manipulated to move the carriage toward the rear of the machine. When the carriage is moved in the opposite direction it is manifest that the platen roller 54 will be moved from said clamping engagement, and thus the platen roller will only force the paper into engagement with the gelatin band during the rearward movement of the carriage. In order that uniform impressions may be taken from the gelatin band, I have provided adjustable stopping devices for the platen frame 50, and these consist of the screws 61 and 62 mounted in arms projecting upwardly from the side members of the platen frame, and these screws abut against the bearing nuts, such as 63 (Fig. 5), for the clamping roller 49, the screws 61 and 62 being retained in adjusted position by lock nuts 64.

The writing transferred onto the gelatin band is usually of limited extent and it is, therefore, advantageous to stop the carriage when it has moved over the writing a sufficient distance to transfer the impression onto the sheets inserted into the carriage. I, therefore, provide a stop arrangement which will function to limit movement of the carriage toward the rear of the machine, and this stop arrangement includes a bracket 65, which embodies an upwardly extending portion 66, through which a horizontally disposed screw 67 is extended which is engaged by a lock nut 68 to retain it in adjusted positon. In the horizontal portions 19 and 20, a plurality of equidistantly spaced apart and aligned openings 69 and 70 are provided. On the bracket 65, are depending bosses 70 and 71, which are spaced in an amount sufficient to permit the insertion of these bosses into adjacent of the openings 69 or 70. By arranging the bosses 71 and 72 in proper ones of the openings 69 or 70 and by adjusting the screw 67, it is manifest that very accurate positioning of the head 73 of said screw may be attained, the position of said head 73 determining the stopping position of the carriage. In either or both the housings 25 and 26, a vertically extending hollow column 74 may be arranged, and a pin 75 is disposed therein. But one of such columns is used in the present instance, but it is within the purview of my invention to provide two, on opposite sides of the machine. The pin 75 abuts the head 73 to effect a stop. The upper end of the column 74 is arranged to provide diametrically opposed seats 76 and other diametrically opposed seats 77 which are arranged at right angles to and below the plane of the seats 76. A transversely extending pin 78 is provided in the pin 75, and by disposing this pin 78 on the seat 76, the lower end of the pin 75 may be positioned above the plane of the head 73, and therefore the carriage may pass thereover without the pin 75 engaging the head 73, and thus movement of the carriage will not be limited, but when the pin 78 is disposed on the seats 77, the lower end of the pin 75 may abut the head 73 and limit movement of the carriage 22. Thus, if it is desired to make impressions on a sheet larger than that which has been operated on, all that is necessary is to change the position of the pin 75 by grasping the head 79 thereof and positioning the transverse pin 78 in the proper location. Engagement of the pin 75 with the head 73 will limit rearward movement of the carriage, but should the pins not be relied on this rearward movement may be limited by engagement of the wheels with vertically extending removable plates provided at the rear ends of the horizontal portions 19 and 20, these plates being removable to permit installation and removal of the carriage from the horizontal portions 19 and 20. On the vertically extending portions of the channel irons 17 and 18, adjacent the forward ends thereof, are angle clips, such as 80. On the walls 27 of the housings 25 and 26, are angle clips 81, and mounted thereon, are resilient bumpers 82 in the form of rubber sleeves. Engagement of the bumpers 82 with the angle clips 80 limits forward movement of the carriage.

The angle clips 80 are so disposed that when the bumpers 82 are engaged therewith, the carriage will be disposed in a position at the start of an impression operation. Therefore, when the platen 54 is disposed in the position illustrated in Fig. 2, and a sheet is inserted in the manner previously described, the margin on said sheet may be determined by providing, at the forward end of the machine, a so-called margin bar, and such a margin bar is indicated in the drawings by 83. Journaled in the vertically extending portions of the angle irons 17 and 18, is a shaft 84. Lugs 85 are secured to the shaft 84 and have connected thereto the depending end portions 86 of a strip 82. The intermediate portion of the strip extends across the machine and supports the margin bar plate 87. Adjacent the forward end of the margin bar plate 87 there is a notch 88 into which the forward edge 89 of a margin plate 90 may fit, the medial portions of said margin plate 90 being pivotally mounted on lugs provided on the plate 87. Along the rear edge of the margin plate 89 a substantially L-shaped strip 91 is secured which has portions 92 in the upper surface thereof cut away. When the forward edge 89 of the margin plate 90 is disposed in the notch 88, a sheet of paper passed between the clamping roller 49 and the platen roller 54 will abut thereagainst and will position the sheet to provide a desired margin. Adjacent the rear end of the margin plate 90, along one edge, an angle clip 93 is provided. At the lower end of the clip is a sleeve 94 through which a pin 95 is extended which has a retaining pin 96 extending diametrically therethrough, a spring 97 being disposed between the pin 96 and the end of the sleeve to urge the pin 95 toward the lug 98 on the margin bar plate 87. An opening 99 is provided in said lug into which the pin 95 may fit, and the action of the spring 97 is limited by the knob 100 provided on the pin 95. By grasping the knob 100, the pin 95 may be retracted from the opening 99, and the forward edge 89 of the margin bar plate 90 may be disposed in the recess 88. However, when the pin 95 is disposed in the opening 99, the parts are disposed in the position illustrated in Fig. 8, and in this instance, a sheet passed between the rollers 49 and 54 will pass over the margin bar until it abuts the strip 91, the cut away portions 92 providing visibility in order that abutment of the sheet may be determined.

It is sometimes desirable to strip the sheets from the gelatin band by hand, and this can best be done by permitting the margin bar to drop downwardly into engagement with the stop 101 (Fig. 8) during rearward movement of the carriage. The margin bar is normally held in an upper position by the engagement of the end of the lug 85 with the shoulder 102 on the pivotally mounted arm 103. Disengagement of the lug 85 from the shoulder 102 permits said lug to fall and engage the stop 101. When in this position, the margin bar is spaced from the rounded edge 12 and, therefore, the projecting edge of a sheet of paper may be readily grasped. However, in order that the margin bar may readily be moved back into gauging position, I provide a crank 104 on one end of the shaft 84, engageable by a cam plate 105 on the side plate 27 of the housing 25, and each time the carriage 22 moves into forwardmost position, the cam plate engages said crank to pivot the margin bar up into gauging position, and as soon as the carriage moves forwardly, the margin bar will fall from said position, and this falling movement will be limited by engagement of the lug 84 with the stop 101. However, as long as the lug 85 is seated on the shoulder 102, the margin bar remains in gauging position.

In use, a sheet of paper is disposed on the paper guide plate 39 in engagement with the paper aligner 40' and is inserted between the clamping roller 49 and the platen roller 54 until one edge thereof engages one of the margin determining edges of the margin bar, it being understood that at this time the carriage is disposed in forwardmost position with the bumpers 82 engaging the angle clips 80. The handle 59 is then gripped and the platen roller is moved toward and past the clamping roller 49 as the carriage is moved rearwardly, and the platen roller forces the sheet into engagement with the gelatin band directed over the supporting bed 10, and an impression is taken from the indicia that has been previously impressed on the band. Movement of the carriage and the handle in the other direction retracts the platen roller and, if desired, the carriage may be used to strip the sheet from the gelatin band. However, if it is desired, the margin bar may be permitted to fall, as has been previously described, and the sheet may be stripped from the gelatin band by grasping the marginal edge thereof adjacent the edge which has been abutting the margin bar, it being understood that when this is done the carriage is entirely disengaged from the other end of the sheet. The stop arrangement I have provided for limiting rearward movement of the carriage may be accurately adjusted to interrupt movement as soon as the carriage has moved sufficiently to transfer all of the impression from the gelatin band on to the sheet, and thus unnecessary movement of the carriage and unnecessary applying of the sheet to the gelatin band may be prevented.

Since all of the holes in the carriage are drilled by use of a drill jig in which a minimum number of locating points are required, it is manifest that high accuracy may be attained. Further, it is apparent that the carriage is supported in a manner which insures the taking of uniform impressions since the support for the carriage is sufficiently rigid to prevent sagging. In addition to this, I have provided an adjustment for the platen roller in the carriage in order that the impression pressure of the platen roller may be accurately adjusted.

It is manifest that I have provided a stop arrangement which may be very accurately adjusted, and it is also apparent that stop devices may be provided on both sides of the carriage to eliminate the likelihood of the carriage being twisted, and by reason of the fact that these stop devices may be accurately adjusted proper positioning thereof may be easily attained.

In addition to the foregoing, I have provided a margin bar which may be readily arranged in a gauging position to determine different margins for the sheet, and it is also manifest that I have provided a margin bar which may be either locked in gauging position or which may be moved to or from gauging position by the carriage reciprocation.

In the foregoing description, I have described a selected embodiment of my invention, but it is to be understood that this is capable of variation and modification, and I therefore do not wish to be limited to the precise details set forth, but desire to avail myself of such changes and alterations as fall within the purview of the following claims.

I claim:

1. In a duplicating machine comprising a main frame having a bed thereon, means carried by said main frame providing trackways at the sides of said bed, a carriage including a cross member having housings at opposite ends thereof, aligned sets of wheels in said housings adjacent the front and rear ends thereof, the wheels of each set having the peripheries thereof spaced to receive the adjacent trackway therebetween to support said carriage for movement longitudinally of said bed, a clamping roller in said carriage, and a platen roller in said carriage movable past said clamping roller into cooperation with said bed, the wheels in said housings disposed below said trackways preventing upward movement of said carriage to thereby counteract the action of said platen roller when moved past said clamping roller to prevent upward movement of the carriage.

2. In a duplicating machine comprising a main frame having a bed thereon, means carried by said main frame providing trackways at the sides of said bed, a carriage including a cross member having housings at opposite ends thereof, said housings including aprons depending past the side edges of said trackways, sets of pins mounted in said housings adjacent the front and rear ends thereof, the pins of each set respectively extending above and below the adjacent trackway, wheels mounted on said pins, the wheels of each set having the peripheries thereof spaced to receive the adjacent trackway therebetween to support said carriage for movement longitudinally of said bed, and strips fast directly to the under side of trackways and engageable with the inner edges of the wheels on said carriage disposed below said trackways to prevent movement of said carriage transversely of said bed.

3. In a duplicating machine comprising a main frame having a bed thereon, means carried by said main frame providing trackways at the sides of said bed, a carriage, means on said carriage engaging said trackways for supporting said carriage for movement along said trackways and over said bed, stop means on one of said trackways, and means in said carriage and extending toward said trackways and engageable with the stop means on said trackways for limiting movement of the carriage in one direction.

4. In a duplicating machine comprising a main frame having a bed thereon, means carried by said main frame providing trackways at the sides of said bed, a carriage, means on said carriage engaging said trackways for supporting said carriage for movement along said trackways and over said bed, stop means on said frame adjacent said bed, and means on said carriage movable to and from a position in which it will engage said stop means to limit movement of said carriage in one direction.

5. In a duplicating machine comprising a main frame having a bed thereon, means carried by said main frame providing trackways at the sides of said bed, a carriage, means on said carriage engaging said trackways for supporting said carriage for movement along said trackways and over said bed, stop means on one of said trackways, means in said carriage and extending toward said trackways and engageable with the stop means on said trackways for limiting movement of the carriage in one direction, resilient stop means on the carriage, and stop means on the frame mounted below and independent of said trackways and engageable by the resilient stop means on the carriage to limit movement of the carriage in the other direction.

6. In a duplicating machine comprising a main frame having a bed thereon, means carried by said main frame providing trackways at the sides of said bed, a carriage, means on said carriage engaging said trackways for supporting said carriage for movement along said trackways and over said bed, said trackways having a plurality of aligned and spaced openings therein, a stop member having portions engageable in adjacent of said openings, and means on the carriage engageable with said stop member to limit movement of the carriage in one direction.

7. In a duplicating machine comprising a main frame having a bed thereon, means carried by said main frame providing trackways at the sides of said bed, a carriage, means on said carriage engaging said trackways for supporting said carriage for movement along said trackways and over said bed, said trackways having a plurality of aligned and spaced openings therein, a stop member having portions engageable in adjacent of said openings, an adjustable member on said stop member providing a head, and means on the carriage engageable with said head to limit movement of the carriage in one direction.

8. In a duplicating machine comprising a main frame having a bed thereon, means carried by said main frame providing trackways at the sides of said bed, a carriage, means on said carriage engaging said trackways for supporting said carriage for movement along said trackways and over said bed, said trackways having a plurality of aligned and spaced openings therein, a stop member having portions engageable in adjacent of said openings, an adjustable member on said stop member providing a head, a stop pin on said carriage, means for supporting said pin in or out of alignment with said head whereby when said pin is aligned with said head and engaged therewith movement of said carriage in one direction may be limited.

9. In a duplicating machine which has a main frame, a supporting bed at the upper end of said main frame, and means for supporting a carriage for movement longitudinally of the bed, the combination of a carriage, means on the carriage disposed on said supporting means, a carrying frame on the carriage, a platen frame pivotally mounted in the carrying frame, a clamping roller in the carrying frame, a platen roller, said platen frame having slots therein, bearings having grooves therein into which opposite edges of the slots are fitted to slidably support said bearings in said slots, the ends of said platen roller being journaled in said bearings, springs acting on said bearings and forcing the platen roller toward the clamping roller, studs extending across the ends of said slots to limit movement of said bearings as caused by said springs, means for holding the platen frame in a determined position, and means for moving the platen frame to move the platen roller into engagement with and past the clamping roller.

10. In a duplicating machine which has a main frame, a supporting bed at the upper end of said main frame, and means for supporting a carriage for movement longitudinally of the bed, the combination of a carriage, means on the carriage disposed on said supporting means, a carrying frame on the carriage, a platen frame pivotally mounted in the carrying frame, a clamping roller in the carrying frame, a platen roller yieldably mounted in the platen frame, means for holding the platen frame in a determined position, means for moving the platen frame to move the platen roller into engagement with and past the clamping roller, and adjustable means on the platen frame for limiting movement of the platen roller past the clamping roller.

11. In a duplicating machine which has a main frame, a supporting bed at the upper end of the main frame, a carriage, and means supporting the carriage for movement longitudinally of the bed, the combination of a margin bar, means on the carriage below the plane of the bed for moving the margin bar into gauging position, means for limiting movement of the margin bar away from gauging position, and means on the margin bar providing variable margin determining positions.

12. In a duplicating machine which has a main frame, a supporting bed at the upper end of the main frame, a carriage, and means supporting the carriage for movement longitudinally of the bed, the combination of a margin bar including a main body, a member pivotally mounted on said main body, and means for positioning said member in open and closed positions.

13. In a duplicating machine which has a main frame, a supporting bed at the upper end of the main frame, a carriage, and means supporting the carriage for movement longitudinally of the bed, the combination of a margin bar including a main body, a member pivotally mounted on said main body, and means for positioning said member in open and closed positions above said main body.

14. In a duplicating machine which has a main frame, a supporting bed at the upper end of the main frame, a carriage, and means supporting the carriage for movement longitudinally of the bed, the combination of a margin bar including a main body, a member pivotally mounted on said main body embodying a margin determining portion, a margin determining portion on the main body, and means for positioning said member whereby one or the other of said margin determining portions will be in margin gauging position.

15. In a duplicating machine which has a main frame, a supporting bed at the upper end of said main frame, a carriage, and means supporting the carriage for movement longitudinally of the bed, the combination of a margin bar plate having a notch in the upper surface and adjacent one edge thereof, a margin plate pivotally mounted on the upper side of the margin bar plate and having a margin determining portion at one end thereof adapted to fit in said notch, said margin bar having a margin determining portion on the upper side thereof and spaced inwardly of said notch, and means for holding said margin plate in a position whereat the margin determining portion is disengaged from said notch so that a sheet may be passed onto said margin bar plate and be engaged with the margin determining portion thereon.

16. In a duplicating machine which has a main frame, a supporting bed at the upper end of said main frame, a carriage, and means supporting the carriage for movement longitudinally of the bed, the combination of a margin bar plate having a notch in the upper surface and adjacent one edge thereof, a margin plate pivotally mounted on the upper side of the margin bar plate and having a margin determining portion at one end thereof adapted to fit in said notch, said margin bar having a margin determining portion on the upper side thereof and spaced inwardly of said notch, and means for holding said margin plate in a position whereat the margin determining portion is disengaged from said notch so that a sheet may be passed onto said margin bar plate and be engaged with the margin determining portion thereon, said means for holding said margin plate including an angle clip secured to said margin plate and embodying a depending portion, a spring-urged pin mounted in said depending portion, and said margin bar plate having a portion thereon providing a recess adapted to receive said spring-urged pin to hold said margin plate in position with the margin determining portion thereof retracted from said notch.

JOHN J. FLANIGAN.